Patented Aug. 18, 1925.

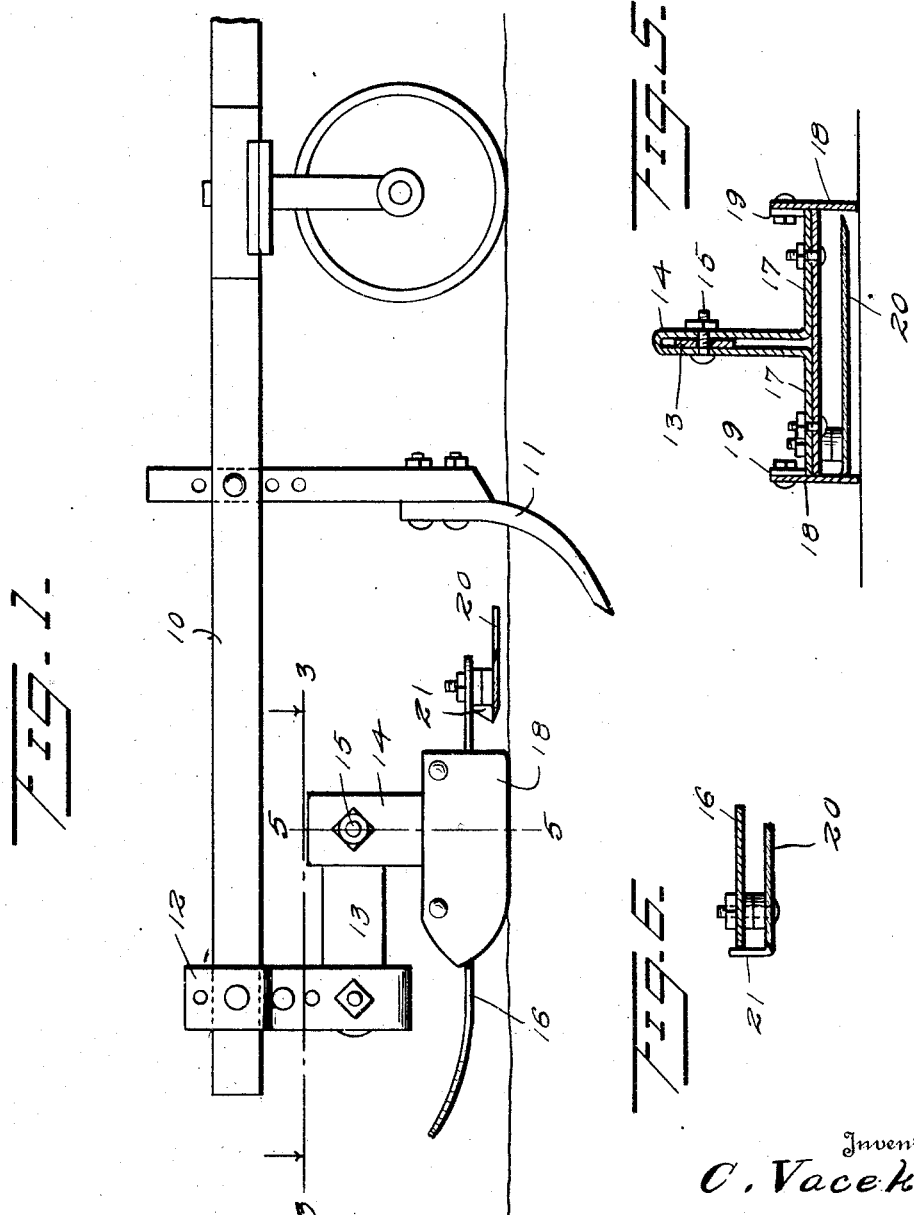

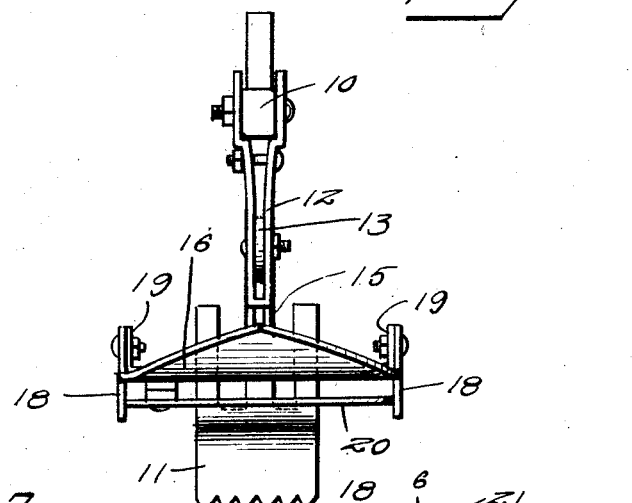
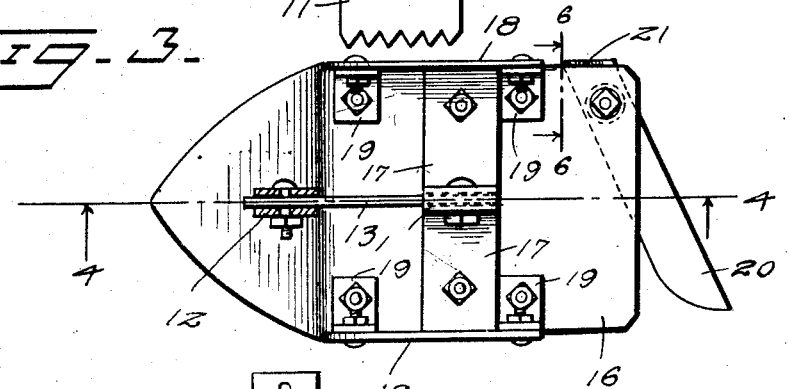
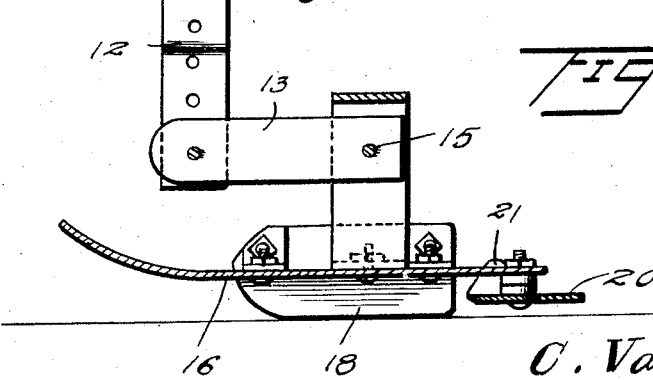

1,550,473

UNITED STATES PATENT OFFICE.

CHARLES VACEK, OF CHICAGO, ILLINOIS, ASSIGNOR OF ONE-HALF TO JOSEPH JANKOVITZ, OF WINNETKA, ILLINOIS.

BEET TOPPER.

Application filed February 2, 1924. Serial No. 690,242.

*To all whom it may concern:*

Be it known that I, CHARLES VACEK, a citizen of Republic of Czechoslovakia, residing at Chicago, in the county of Cook and State of Illinois, have invented certain new and useful Improvements in Beet Toppers; and I do hereby declare the following to be a full, clear, and exact description of the invention, such as will enable others skilled in the art to which it appertains to make and use the same.

The present invention relates to agricultural machinery designed chiefly for harvesting and specifically for removing the tops of sugar beets in advance of the lifter or digger and acting jointly therewith.

One of the principal objects of the invention is the provision of a topper which may be attached to the same means as the lifter and which has an independent movement to adapt itself to the beets so as to cut off the tops close to the bulbs without injury thereto.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is an elevational view showing the application of the invention,

Figure 2 is a front view,

Figure 3 is a top plan view of the topper,

Figure 4 is a vertical longitudinal section on the line 4—4 of Figure 3,

Figure 5 is a vertical transverse sectional view on the line 5—5 of Figure 1, and Figure 6 is a detail sectional view on the line 6—6 of Figure 3.

Corresponding and like parts are referred to in the following description and designated in the several views of the drawings by like reference characters.

The numeral 10 designates the beam of a beet harvester and 11 the usual shovel for lifting or digging the beets. These parts are of well known construction and are shown to illustrate the application of the invention.

A standard 12 is clamped to the beam 10 and, as shown, consists of a metal strap doubled upon itself and having the beam 10 clamped between the folded end portion. A link 13 is pivoted at its front end between the folded portion of the standard 12 and an upright 14 is pivoted to the rear end of the link 13, as indicated at 15. A plate 16 is attached to the lower end of the upright 14 and its front end is pointed and curved upwardly so as to engage and ride over the tops of the beets. The plate 16 constitutes a shoe and is free to rise and fall so as to follow the contour of the ground and the line of the row of beets. The upright 14 consists of a metal strap which is folded upon itself, the end portions of the folded parts being bent outwardly, as indicated at 17, and bolted or otherwise secured to the plate 16. Runners 18 are disposed at opposite sides of the shoe 16 and project above and below the plane of the shoe, as indicated most clearly in the several views. The runners 18 consist of elongated plates which are secured to opposite edge portions of the plate 16 by means of brackets 19 which are bolted or otherwise secured to the parts 16 and 18, as clearly indicated in the several views.

The cutter consists of a blade 20 which is disposed beneath the rear end of the shoe 16 and which is attached at one end thereto and inclines rearwardly towards its free end, as shown most clearly in Figure 3, whereby to sever the tops of the beets by a shear action. The blade 20 adjacent the end fast to the shoe 16, is upturned as indicated at 21, said upturned end being in line with the adjacent runner 18. The blade 20 is spaced from the shoe 16 a distance to insure a cutting of the tops close to the beets.

What is claimed is:

1. A beet topper comprising a plate having its front end pointed and upwardly curved, runners at opposite sides of the plate and extending above and below the same, and a cutter disposed below the rear portion of the plate and laterally inclined to operate by a shear action, a strap forming an attaching standard for the device, said strap having lateral portions disposed on top of and secured to the plate.

2. A beet topper comprising a relatively wide and long plate arranged substantially parallel to the ground, runners at opposite sides of said plate extending above and below the plate, a cutter suspended from the plate, cleats connecting the plate and runners together and engaging the latter above the plate, and a strap forming an attaching standard for the device having lateral portions engaging and being fastened to the upper surface of the plate.

In testimony whereof I affix my signature.

CHARLES VACEK.